US007015780B2

(12) United States Patent
Bernstein et al.

(10) Patent No.: US 7,015,780 B2
(45) Date of Patent: Mar. 21, 2006

(54) APPARATUS, DEVICE AND METHOD FOR GENERATING MAGNETIC FIELD GRADIENT

(75) Inventors: Jonathan Jay Bernstein, Medfield, MA (US); William Patrick Taylor, North Andover, MA (US); John David Brazzle, Milford, NH (US); Christopher John Corcoran, Woods Hole, MA (US); James Kelly Lee, Rochester, NY (US)

(73) Assignee: Corning Incorporated, Corning, NY (US)

( * ) Notice: Subject to any disclaimer, the term of this patent is extended or adjusted under 35 U.S.C. 154(b) by 285 days.

(21) Appl. No.: 10/180,013

(22) Filed: Jun. 25, 2002

(65) Prior Publication Data

US 2003/0234711 A1 Dec. 25, 2003

(51) Int. Cl.
*H01F 7/20* (2006.01)
(52) U.S. Cl. ........................ 335/302; 335/285; 335/306
(58) Field of Classification Search ........ 335/285–306; 310/40 MM; 269/8
See application file for complete search history.

(56) References Cited

U.S. PATENT DOCUMENTS

| | | | | | |
|---|---|---|---|---|---|
| 2,615,227 | A | * | 10/1952 | Hornik ........................ | 24/303 |
| 3,102,314 | A | * | 9/1963 | Alderfer ..................... | 24/303 |
| 4,197,618 | A | * | 4/1980 | Bourguignon ............... | 24/303 |
| 4,391,270 | A | * | 7/1983 | Uragami ..................... | 600/15 |
| 4,798,194 | A | * | 1/1989 | Amishima .................... | 600/9 |
| 4,941,236 | A | * | 7/1990 | Sherman et al. ............. | 24/303 |
| 5,099,659 | A | * | 3/1992 | Carranza et al. ............. | 63/3 |
| 5,214,404 | A | * | 5/1993 | Yamaguchi et al. ........ | 335/302 |
| 5,621,369 | A | * | 4/1997 | Gardner et al. ............ | 335/302 |
| 5,626,099 | A | * | 5/1997 | Staller et al. ............... | 119/625 |
| 5,655,665 | A | | 8/1997 | Allen et al. | |
| 5,691,683 | A | * | 11/1997 | Allwine, Jr. ................ | 335/306 |
| 5,834,864 | A | * | 11/1998 | Hesterman et al. ... | 310/40 MM |

OTHER PUBLICATIONS

U.S. Appl. No. 09/939,422, filed Aug. 2000, Bernstein et al.
U.S. Appl. No. 10/085,963, filed Feb. 2002, Taylor et al.
L. K. Lagorce and M.G. Allen, "Micromachined polymer magnets," in *Proc. IEEE 9th Annu. Int. Workshop on Micro Electro Mechanical Syst.*, Feb. 1996, pp. 85-90.
Laure K. Lagorce, Oliver Brand, Member, IEEE, and Mark G. Allen, Member IEEE, Magnetic Microactuators Based on Polymer Magnets, IEEE Journal of Microelectromechanical Systems, vol. 8, No. 1, Mar. 1999, pp. 2-9.

(Continued)

*Primary Examiner*—Ramon M. Barrera
(74) *Attorney, Agent, or Firm*—Joanne N. Pappas

(57) ABSTRACT

A monolithic or dual monolithic magnetic device or apparatus having an array of formations such as protruding or raised nubs wherein adjacent nubs have the same or opposite polarity to produce a high magnetic field gradient in the vicinity of the nubs is described. In lieu of nubs, the use of a magnetic device with thru-holes, blind holes, filled holes, or iron flux concentrators is also detailed, wherein all embodiments result in regions of high magnetic field gradient. Apparatus and methods for spot-poling a magnet array are also illustrated.

An application of an array of MEMS actuators using the magnets of the present invention to produce high field gradient at precise locations is described. A further application of a biochemical separation unit containing a magnetic array and micro-fluidic channels for separating out magnetic particles tagged with bio-specific molecules for sensing the presence of a disease or specified chemicals is also described.

84 Claims, 9 Drawing Sheets

OTHER PUBLICATIONS

Jae Y. Park, Laure K. Lagorce, and Mark G. Allen, School of Electrical and Computer Engineering, Georgia Institute of Technology, Atlanta, GA 30332-0269, USA, IEEE Transactions of Magnetics, vol. 33, No. 5, Sep. 1997, pp. 3322-3324.

Laure K. Lagorce and Mark G. Allen, Member, IEEE, "Magnetic and Mechanical Properties of Micromachined Strontium Ferrite/Polyimide Composites," Journal of Microelectromechanical Systems, vol. 6, No. 4, Dec. 1997, pp. 307-312.

* cited by examiner

APPARATUS, DEVICE AND METHOD FOR GENERATING MAGNETIC FIELD GRADIENT

FIELD OF THE INVENTION

This invention relates generally to magnetic fields, and more particularly for generating and using electromagnetic field gradients in applications such as actuation of MEMS arrays.

BACKGROUND OF THE INVENTION

As it is known in the art, magnetic forces can be used to induce mechanical motion or actuation of magnetic materials.

Electric current flowing through a conductor (e.g. a wire) induces a magnetic field around the conductor due to Faraday's law of induction (e.g. an electromagnet). The actuation of the electromagnet creates a magnetic field and hence regions of field gradient.

Such actuation has many applications. For instance, many electromechanical switch designs rely upon a magnetic field or field gradient, where a mechanical electrode is pulled into contact with another electrode via magnetic force. For instance, magnetic switching mechanisms have been used to actuate Micro-Electro-Mechanical (MEMS) switches. Typically, in these electromagnetic actuator designs, the magnetic field interacts with an electric current element on the actuator, for instance, a coil, to generate torques for rotation or forces for displacement in a particular direction. The current flowing through the coil pulls the micro-machined electrode towards another electrode, delivering large actuation forces. In general, it is desirable to have a permanent magnet to produce numerous regions of high magnetic field gradient. An array of MEMS devices may require an array of high field or high field gradient regions.

Typically where a body is defined as a magnet, one of ordinary skill in the art would know it to mean hard magnetic material. Hence, the terms magnet, permanent magnet, and hard magnet are used interchangeably. A soft magnetic material, as it is known in the art, is usually not referred to as a magnet.

Hard magnetic materials generally have a high remanence field. They keep most of their magnetization when an applied field is removed. Examples of permanent or hard magnetic materials are Alnico, Neodymium Iron Boron (Ne—Fe—B), Samarium-Cobalt (Sm—Co), Strontium-Ferrite ($SrO$-$6Fe_2O_3$), or Barium Ferrite ($BaO$-$6Fe_2O_3$).

Soft magnetic materials generally have a small remanence field. Conversely, they lose most of their magnetization when an applied field is removed. Soft magnetic materials may have high saturation flux density (i.e. greater than 0.5 Tesla) and high relative permeability (i.e. greater than 100). Examples of soft magnetic materials include, but are not limited to, pure or soft iron, steel alloy 1010, low carbon steel with carbon less than 4%, Iron-Cobalt (Fe—Co) alloys, Iron-Nickel-Cobalt (Fe—Ni—Co) alloys, or Iron-Nickel (Fe—Ni) alloys such as permalloy.

Magnetic field gradients are also useful as magnetic particle separators. A particle with a relative magnetic permeability larger than the surrounding fluid is attracted in the direction of a magnetic field gradient. In such separation devices, micro-fluidic channels carry magnetic particles that are concentrated by regions of high magnetic field gradient. These magnetic particles are usually tagged with highly specific sensor molecules such as antigens or antibodies that can be used for sensing disease or a specific chemical.

In the prior art, several approaches have been used to produce a magnetic field or field gradient for electromagnetic MEMS actuator designs. One prior art approach involves having several large magnets positioned outside the actuator or an actuator array. Other approaches include an array of numerous magnets under an actuator or an actuator array.

While these methods of using magnet arrays assembled from many small magnets produce a high magnetic field gradient, there are several disadvantages that pose significant design and performance challenges.

As more magnets are added to the array, there is a substantial tolerance build up that occurs. Tolerance build up typically occurs when several parts are combined to form an array. The mechanical tolerances of each part accumulate so that the position of any one part is poorly determined.

For instance, though it is possible to micro-machine a silicon chip consisting of an array of actuators with extreme dimensional precision, there is no known effective method for manufacturing a magnet device with corresponding dimensional precision to provide a large number of regions with high magnetic field gradient. Hence, the magnets may end up in the wrong position (i.e. not centered with actuator or not in ideal position) due to tolerance build up. These types of dimensional errors in a magnet array are significant because they result in sub-optimal motion of the actuators, such that the actuators move in the wrong direction or have a large variation in performance.

Additionally, magnets may attract debris (i.e. magnetic particles) that adheres to the sides of the magnet. Furthermore, the particles are difficult to remove and may affect tolerances thereby leading to further dimensional error in the position of the magnets when compared to ideal positions.

One way to avoid the tolerance build up and the debris problems is to purchase magnets with extremely tight tolerances and assemble them into perfectly clean arrays (i.e. no particles). This design solution, however, is cost-prohibitive. Cleaning these magnets is difficult since small magnetic particles cling tightly to the magnets, making them virtually impossible to clean by conventional means, such as detergents, solvents, and air jets, to name a few.

In summary, the prior art use of magnet arrays assembled from many small magnets decreases performance, while increasing complexity and cost in the assembly of the final actuator packaged device.

A magnet device, apparatus and method is needed with dimensional precision to produce a high magnetic field gradient at one or more locations, while avoiding the tolerance build up of other devices.

A magnet device, apparatus and method is needed with dimensional precision that can produce a high magnetic field gradient at one or more locations, while avoiding the magnetic particle debris of other devices.

A magnet device, apparatus and method is needed with dimensional precision that can produce a high magnetic field gradient at one or more locations, while avoiding the complexity and cost of other devices.

These and other limitations of the prior art are addressed in the present invention.

SUMMARY OF THE INVENTION

One embodiment of the present invention relates to a magnetic device including a monolithic body having formations that produce a magnetic field gradient. The formations are constructed from the monolithic body and include an array of protruding nubs or ridges where the monolithic body and the formations are made of a permanent or hard magnetic material. The formations are periodic and hence the magnetic field gradient produced is periodic.

In another embodiment of the present invention the formations include an array of thru-holes where the monolithic body is made of a permanent or hard magnetic material. The thru-holes are filled with soft magnetic material or fill. The thru-holes are partially filled, fully filled or over filled with the fill. A layer of fill covers a portion of the monolithic body. In an alternate embodiment of the present invention the monolithic body is made of a soft magnetic material and the thru-holes are partially filled, fully filled, or over filled with hard magnetic material or fill. A screening process may be used to fill the thru-holes.

In another embodiment of the present invention the formations include an array of blind-holes where the monolithic body is made of a permanent or hard magnetic material. The blind-holes are filled with soft magnetic material or fill. The blind-holes are partially filled, fully filled or over filled with the fill. In an alternate embodiment of the present invention the monolithic body is made of a soft magnetic material and the blind-holes are partially filled, fully filled, or over filled with hard magnetic material or fill. A screening process may be used to fill the blind-holes.

In another embodiment of the present invention the formations include thru-holes and blind-holes.

In another embodiment of the present invention the magnetic device further includes a MEMS device with an array of actuators placed above each of the formations. The actuators are electromagnetic mirrors.

In another embodiment of the present invention the magnetic device further includes a biochemical separation unit capable of separating out magnetic particles.

Another embodiment of the invention relates to a dual monolithic magnetic device including a first monolithic body having first formations and a second monolithic body having second formations, where the first monolithic body is placed on the second monolithic body producing a magnetic field gradient. The first and second formations are periodic and the magnetic field gradient produced by the first and second formations is also periodic. In one alternate embodiment of the present invention, the first formations are an array of thru-holes and the second formations are an array of protruding nubs. The first monolithic body is made of a hard magnetic material and the second monolithic body is made of a soft magnetic material. The second formations are made of a soft magnetic material and they are level, fall below, or extend above a top surface of the first monolithic body. The first and second monolithic bodies are held together with an adhesive or a mechanical clamp. The second formations have guiding or flux concentrating features. In an alternate embodiment of the present invention, the first monolithic body is made of a soft magnetic material and the second monolithic body and second formations are made of a hard magnetic material.

In another embodiment of the present invention the dual monolithic magnetic device further includes a MEMS device with an array of actuators placed above each of the formations, where the actuators are electromagnetic mirrors.

In another embodiment of the present invention the dual monolithic magnetic device further includes a biochemical separation unit capable of separating out magnetic particles.

Another embodiment of the invention relates to a dual monolithic magnetic device including a first monolithic body having first formations and a second monolithic body, where the first monolithic body is placed on the second monolithic body producing a magnetic field gradient. The first formations are periodic and the magnetic field produced is periodic. The first formations include an array of thru-holes with an array of inserts of magnetic material inserted into the thru-holes. The inserts are level, fall below, or extend above a top surface of the thru-holes of the first monolithic body. The first monolithic body is made of a hard magnetic material and the second monolithic body is made of a soft magnetic material. The inserts may be hard or soft magnetic material. In an alternate embodiment, the first monolithic body is made of a soft magnetic material and the second monolithic body is made of a soft magnetic material and the inserts are made of a hard magnetic material. In an alternate embodiment, the first monolithic body is made of a hard magnetic material and the second monolithic body is made of a hard magnetic material and the inserts are made of either soft or hard magnetic material. In the embodiment of the present invention the inserts may have a flat top surface, or may alternately have a conical, pyramidal, or rounded top surface.

In another embodiment of the present invention the dual monolithic magnetic device further includes a MEMS device with an array of actuators placed above each of the formations, where the actuators are electromagnetic mirrors.

In another embodiment of the present invention the dual monolithic magnetic device further includes a biochemical separation unit capable of separating out magnetic particles.

One embodiment of the present invention relates to a dual monolithic magnetic device including a first monolithic body having an array of flux concentrators placed on a second monolithic body producing a magnetic field gradient. The flux concentrators are periodic and produce a periodic magnetic field gradient. The first monolithic body is made of a hard magnetic material while the second monolithic body and the flux concentrators are made of a soft magnetic material.

Another embodiment of the present invention relates to an apparatus for spot-poling a monolithic magnet array that includes a top magnetic plate with an array of top protruding teeth coupled with a bottom magnetic plate with an array of bottom protruding teeth to receive a magnet. The apparatus further includes a circuit attached to the top and bottom magnetic plates and a coil coupled with the top and bottom magnets and the circuit. A charge from the circuit is dissipated through the coil to produce magnetic field in regions between the top and bottom protruding teeth.

Another embodiment of the present invention relates to a method of spot-poling a magnet which includes uniformly magnetizing the magnet with a first polarity, covering at least one region of the magnet on both sides; and applying a large magnetic field to the magnet producing a second polarity in the covered regions, where the second polarity is opposite of the first polarity. The method further includes the step of repeating the step of applying a large magnetic field to the magnet. The magnetic device is a monolithic body or dual monolithic body that may include an array of protruding nubs or ridges.

Another embodiment of the present invention relates to a method of spot-poling a magnet including applying a large magnetic field to the magnet producing a first polarity, moving the magnet; and applying a large magnetic field to the magnet producing a second polarity, the second polarity being opposite of the first polarity. The method further includes the step of repeating the step of applying a large magnetic field to the magnet. The magnetic device is a monolithic body or dual monolithic body may include formations such as an array of protruding nubs or ridges.

The device, apparatus, and method of the present invention results in numerous advantages over prior art. For example, a high magnetic field gradient is produced while avoiding the tolerance build up or debris of other devices, and avoiding other devices' complexity and costs.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

This invention is further illustrated with reference to the following drawings in which:

FIG. 16 shows a top view of a spot-poled monolithic magnet.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
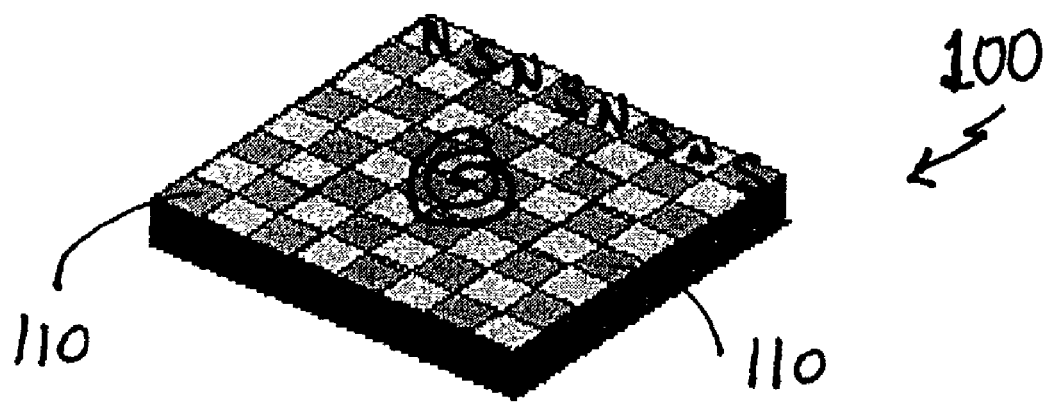
FIG. 1 shows an assembled magnet array.

Referring now to FIG. 1, a non-monolithic structure including individual magnets 110 assembled into a magnet array 100 is shown. The different shades in the arrangement represent different magnetic polarity, either north (pointing up out of the plane of the array) or south (pointing down out of the plane of the array). Hence, this structure may be referred to as the "checkerboard" structure. Due to alternating N/S polarity of the checkerboard magnets, the field above the magnets has a rapid spatial variation. This high field gradient is useful in actuating certain classes of electromagnetic actuators.

The force F on a magnetic dipole (m) in a field gradient is given by the equation:

$$F = \nabla(\overline{m} \cdot \overline{B}) = (\overline{m} \cdot \nabla)\overline{B}$$

where the force F is proportional to the magnetic field gradient $\nabla \overline{B}$. Hence, a high field gradient is needed to apply a large force to a current loop or coil.

In one type of application, the "checkerboard" magnet array 100 is positioned underneath a Micro-Electro-Mechanical (MEMS) device having an array of electromagnetic actuators. Each individual magnet 110 therefore, is positioned underneath a corresponding actuator. Each magnet 110 produces a magnetic field gradient in the local area of the MEMS device that induces a force or displacement of each actuator. However, while the magnetic field gradient produced is desirable in the non-monolithic structure of the array as shown in FIG. 1, there are several disadvantages that present challenges to one of skill in the art as also discussed supra in the Background of the Invention Section. In summation, one disadvantage is that, because an assembly of the individual magnets 110 is required to form the magnet array 100, this assembly manufacturing process adds extra time and costs. Furthermore, the final assembly structure innately produces a build up of mechanical tolerances leading to dimensional misalignment between the actuator array and the magnet array. Likewise unfavorable still, the array structure as shown in FIG. 1 allows for the build up of magnetic dust and/or particles of debris between individual adjacent magnets 110, as dust and debris are attracted in and through the minute separations.

These and other elements of the embodiment shown in FIG. 1 are described in further detail in pending United States Patent Application assigned to Assignee hereof, entitled, MAGNETICALLY ACTUATED MICRO-ELECTRO-MECHANICAL APPARATUS AND METHOD OF MANUFACTURE, Ser. No. 09/939,422, filed on Aug. 27, 2000, and incorporated by reference herein.

Figure 2:
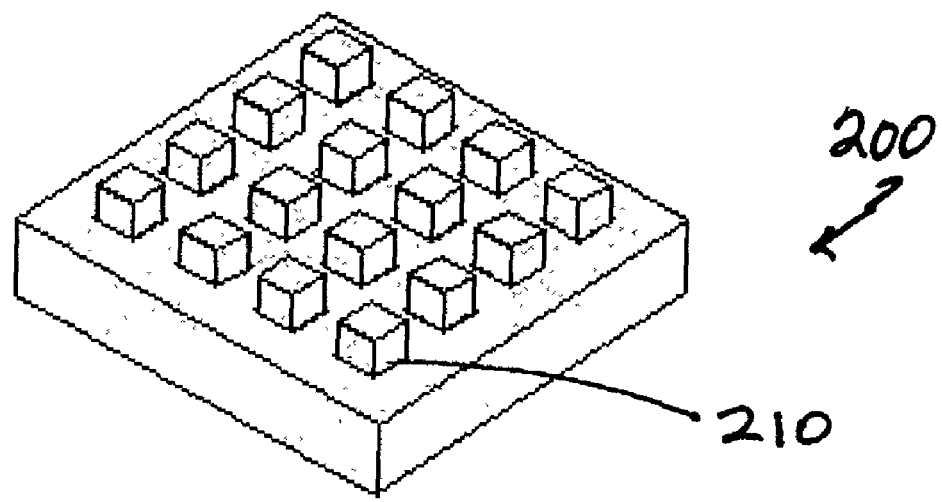
FIG. 2 shows a perspective view of a monolithic magnetic device with an array of protruding nubs in accordance with the present invention.

Referring now to FIG. 2, a preferred embodiment of the present invention including a monolithic magnetic material 200 that has an array of formations is shown. It should be noted that, in embodiments of the present invention discussed infra, the notion of an array signifies a plurality, hence, two or more. In FIG. 2, for instance, an array of formations signifies that there are at least two formations. These formations are constructed from the body of the monolithic magnetic material 200. In FIG. 2, the formations are in the form of protruding or raised nubs or ridges 210 formed from the magnetic material as shown. The magnetic material 200 including the nubs 210 of the present invention is desirably made of a permanent or hard magnetic material, such as Nd—Fe—B or Sm—Co.

The pitch of the magnet array typically corresponds to the pitch of the transducer (i.e. a MEMS wafer with coils) array. In some cases, (e.g. the checkerboard array) the pitch of the magnets may be a multiple or sub-multiple of a transducer array. For the magnet array shown in FIG. 2, one nub would be positioned under each actuator. The diameter of the nub may vary between 0.1 and 0.9 times the pitch of the nubs. In a preferred embodiment of the present invention, the nub diameter is substantially equal to the outer diameter of the coils on the MEMS transducer. In addition to nubs, as will be discussed infra, the magnet array may have other periodic formations, such as thru-holes or other inserts or flux concentrators. For all preferred embodiments of the present invention, the formations or other inserts or flux concentrators have a diameter that may vary between 0.1 and 0.9 times the pitch of the formations, inserts or flux concentrators, respectively.

The raised nubs 210 induce regions of high magnetic field gradient. Around the peripheral sides of each nub a virtual solenoid is created due to the magnetic polarization of the nub. This virtual solenoid creates the desired magnetic field gradient. The entire monolithic magnet array may be polarized in one direction so that all the nubs are poled North or South up. Alternatively, as discussed supra with the "checkerboard" design shown in FIG. 1 and infra in FIG. 21, the magnetic polarity of each adjacent nub 210 is opposite, one nub has a polarity north (pointing up out of the plane of the array) and the adjacent nub has a polarity south (pointing down out of the plane of the array).

As shown in FIG. 2, the nubs 210 are periodic. Hence, the magnetic field gradient produced would also be periodic.

The monolithic magnetic material 200 is machined with nubs 210 to provide precise locations of the magnetic field gradient. One application of such a "nub" embodiment strategically positions the monolithic magnet 200 and nubs 210 under an electromagnetic MEMS actuator array (not shown) whereby each of the protruding nubs 210 is aligned and positioned directly underneath each one of the actuators in the array. The force provided by the magnetic field gradient from the nubs 210 displaces or motions the actuator situated above it when current is passed through the MEMS actuator.

In accordance with the present invention, the actuators can be mirror devices. The array of MEMS mirrors can be arranged in many beneficial ways. One mirror takes the form of a "see-saw" or a double paddle arrangement and is supported in the center by flexural springs. The mirrors may also be offset or staggered to allow a series of mirrors with very high fill factor in the center. Magnets 200 placed under the mirror array permit electromagnetic actuation. Hence, each nub 210 is also staggered, positioned directly underneath each one of the staggered mirrors. As described supra, coils of metal deposited on the paddles work in such a way that when current is applied to the coils, an interaction with the magnetic field from the magnets nearby causes the mirrors to tilt about one or two axes.

This staggered arrangement and other mirror arrays are described in pending United States Patent Application assigned to Assignee hereof, entitled, MICROELECTROMECHANICAL MIRROR DEVICES HAVING A HIGH LINEAR MIRROR FILL FACTOR, Ser. No. 10/085,963, filed on Feb. 28, 2002, and incorporated by reference herein.

One of the advantages of the monolithic structure of the preferred embodiment of the present invention of FIG. 2 is the significant elimination of the build up in mechanical tolerances like those found in non-monolithic structures. An advantage of the nubs 210 of FIG. 2 is in the creation of multiple regions of diverging magnetic field that interact with the current carrying coils to yield enhanced torque in comparison to the magnet structure where no nubs are present. A further advantage of the monolithic structure shown in FIG. 2 is that when a nub 210 is positioned under an actuator of an actuator array in a precise location (i.e. center), there is a significant improvement in the accuracy of movement for each of the actuators. An even further advantage of the monolithic structure of the present invention shown in FIG. 2 over the assembled structure shown in FIG. 1 is the considerable reduction in manufacturing assembly time required for production of a final magnet array.

Figure 3:
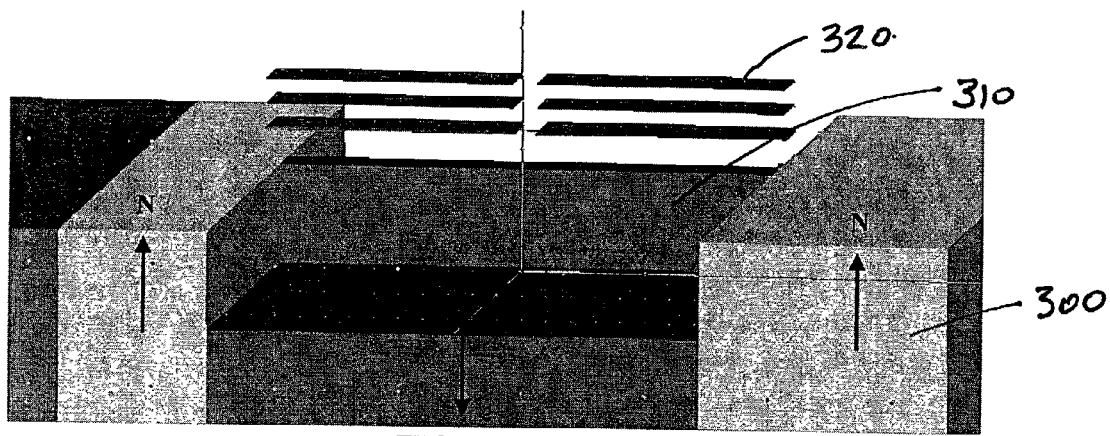
FIG. 3 shows a perspective view of a monolithic magnetic device with one nub underneath coils of a mirror array in accordance with the present invention.
Figure 4:
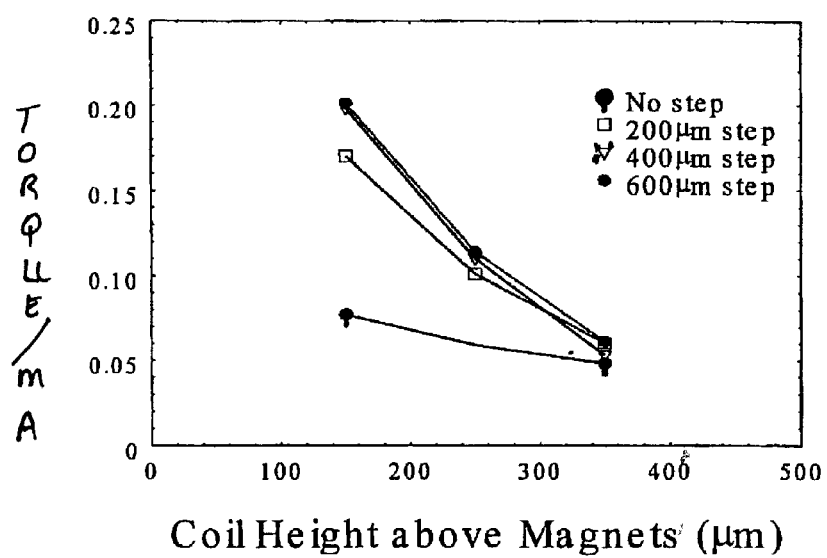
FIG. 4 shows a plot of the torque per mA versus the coil height above the magnets or nub.

Referring now to FIG. 3, a detailed view of the present invention is shown to include a monolithic magnet structure 300 with nub 310 situated under coils 320 of a mirror array, in this case, a double paddle arrangement. Note that in FIG. 3 the mirror, springs, and supports are not shown. The magnets are alternately poled N, S, N as shown. The presence of this nub 310 increases the torque available per mA of current flowing through the coils 320. The coils shown represent three different possible heights or levels where the coils 320 could be situated above nub 310. The increase in torque per mA of current versus the magnet to coil spacing is shown in the plotted graph of FIG. 4. It should be noted that for a 150 micron gap, the nub gives a three-fold improvement in the torque.

While there are several advantages and problems that are solved with the monolithic "nub" design of FIGS. 2 and 3 over the "checkerboard" design of FIG. 1, even further increases in the magnetic field density (resulting in higher torque per mA) provided to the actuators may be desired. Several alternate embodiments in accordance with the instant invention discussed infra increase the magnetic field density produced as well as provide the advantages over the design discussed supra with respect to FIG. 2 or FIG. 3.

Figure 5:
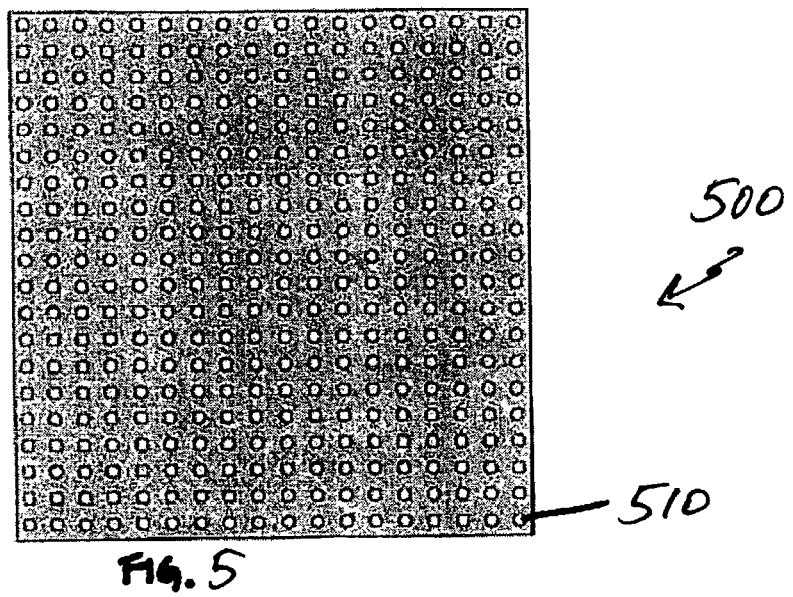
FIG. 5 shows a top view of a monolithic magnetic device with an array of thru-holes in accordance with the present invention.
Figure 6:
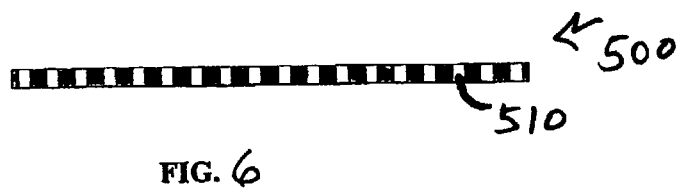
FIG. 6 shows a side view of a monolithic magnetic device with an array of thru-holes in accordance with the present invention.

An alternate preferred embodiment of the present invention is shown in FIGS. 5 and 6. FIG. 5 shows a top view of a monolithic magnet 500 with an array of formations constructed from the magnet 500. In FIG. 5, the formations are shown as thru-holes 510 in accordance with the present invention. FIG. 6 shows a side view of the monolithic magnet 500 with the array of thru-holes 510. The magnetic material 500 shown in FIGS. 5–8 of the present invention is preferably a permanent magnetic material.

In a preferred embodiment, the thru-holes 510 are machined or drilled all the way through the magnetic material 500. A virtual solenoid of current is then produced on the interior surface of the thru-holes 510.

Figure 7:
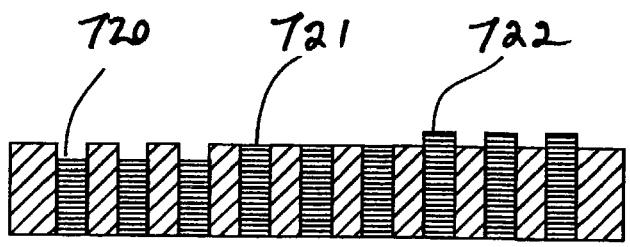
FIG. 7 shows a side view of a monolithic magnetic device with an array of thru-holes in accordance with the present invention.

In accordance with the preferred embodiment of the present invention, the thru-holes 510 of FIGS. 5 and 6 can be partially filled 720, fully filled 721, or overfilled 722 with soft magnetic material as shown in FIG. 7. In such cases as in FIG. 7, there is an increase of magnetic field gradient produced over that of FIGS. 5 and 6 with no fill.

Figure 8:
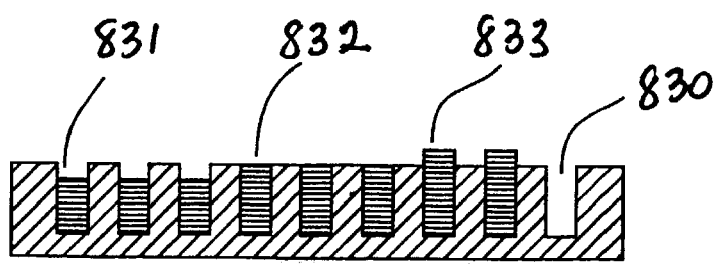
FIG. 8 shows a side view of a monolithic magnetic device with an array of blind holes in accordance with the present invention.

In an alternate embodiment of the present invention as shown in FIG. 8 and discussed below, the holes 510 can be formed where drilling does not extend all the way through the entire piece of magnetic material 500. These holes are generally referred to as "blind-holes" 830 as shown in FIG. 8.

Referring to FIG. 8, the blind-holes formed because the holes of FIGS. 5 and 6 were not drilled all the way through the magnetic material 500, "blind-holes" 830 and likewise as with FIG. 7, in accordance with an alternate embodiment of the present invention, the blind-holes 830 can be partially filled 831, fully filled 832, or over filled 833 preferably with a soft magnetic material, such as soft iron or steel. Blind-holes 830 may provide an advantage as part of a hermetic package where thru-holes would cause leakage. However, blind-holes may be more difficult to manufacture. Like thru-holes, blind-holes also provide an increase of magnetic field gradient produced over that of FIGS. 5 and 6 with no fill.

Generally speaking with respect to FIGS. 7 and 8, in accordance with the present embodiment of the invention, if the magnetic material 500 is made of a permanent magnetic material, it is preferred to have a soft magnetic material utilized for the fill in FIG. 7 or 8. The soft magnetic material or fill provides a reduced reluctance return path for the flux from the magnetic material 500 over unfilled holes in FIGS. 5–6. And since, as mentioned supra, soft magnetic materials such as iron, steel alloy 1010 and various Co—Fe alloys have very high saturation flux densities, the soft magnetic fill provides a low reluctance path when placed in the thru-holes. Hence, the net effect can be viewed as a background array with north facing magnetic material containing a periodic array of south facing magnetic material, thereby creating a very high magnetic field gradient centered on each of the thru-holes.

On the contrary, in an alternate preferred embodiment of the present invention, if the magnetic material 500 is made of a soft magnetic material, it would likewise be possible to utilize a hard magnetic material for the fill in FIG. 7 or 8. With respect to either case (i.e. a hard magnetic material with soft magnetic fill or a soft magnetic material with hard magnet fill), there is an increase of magnetic field gradient produced over that of FIGS. 5 and 6. This remains the case regardless of whether a "thru-hole with fill" design of FIG. 7 is utilized or whether a "blind-hole with fill" design of FIG. 8 is utilized.

It should be noted that the thru-hole arrangements of FIGS. 5–7 may be combined in any format or variation with the blind-hole arrangements of FIG. 8 to create a mixed-hole embodiment of the present invention (not shown).

Additionally an alternate embodiment of the present invention includes a monolithic magnet with thru-holes at least partially filled with magnetic material where magnetic material is utilized to fill the thru-holes such that they are partially-filled, fully-filled, or over-filled and where the magnetic material also creates a layer on a surface of the monolithic magnet (not shown).

In an alternate embodiment of FIG. 7 or FIG. 8, screen printing processes known in the art may be utilized to fill the thru-holes, where the fill can be a composite containing soft or hard magnetic material.

Figure 9:
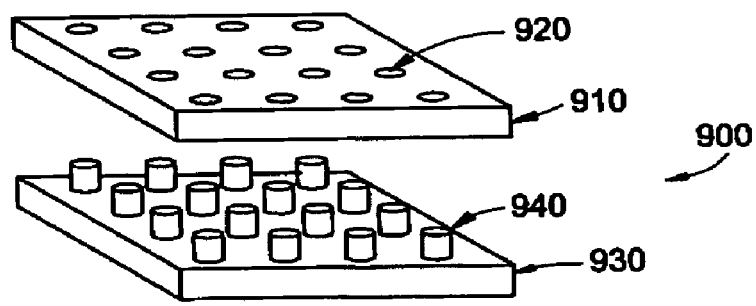
FIG. 9 shows a perspective view of a dual monolithic magnetic device arrangement, the top monolithic magnet with an array of thru-holes and the bottom monolithic magnet with an array of protruding nubs in accordance with the present invention.

Referring now to FIG. 9, an alternate preferred embodiment of the present invention is shown having a dual monolithic magnet arrangement 900. In accordance with the present invention, arrangement 900 is shown having a top monolithic magnet 910 with an array of formations or thru-holes 920 and a bottom monolithic magnet 930 with an array of formations or protruding nubs 940 filling thru-holes 920. The nubs 940 are constructed or machined from the bottom monolithic magnet 930 and hence, would comprise the same magnetic material as the bottom monolithic magnet 930. Preferably, though not limited to, the top monolithic magnet 910 is made of a permanent or hard magnetic material while the bottom monolithic magnet 930 and the nubs 940 are made of a soft magnetic material. The soft magnetic material is a low reluctance path for the flow of magnetic flux, as a short circuit or low resistance path would be in the case of the flow of electric current. The soft magnet bottom acts like a short circuit that results in an increase of the magnetic flux density in the desired region for a strong field. The protruding nubs of FIG. 9 can be viewed as fulfilling a similar role as the soft magnetic fill discussed above in conjunction with FIGS. 7 and 8.

In an even further alternate embodiment of FIG. 9, the top monolithic magnet 910 is made of a soft magnetic material while the bottom monolithic magnet 930 and protruding nubs 940 are made of a hard or permanent magnetic material. A further still embodiment of FIG. 9 comprises a hard or permanent magnetic material for each of the top monolithic magnet 910, bottom monolithic magnet 930 and protruding nubs 940.

The use of opposing or alternating polarization magnets causes the "far field" (i.e. the magnetic field far from the magnets) to be reduced, thereby generally reducing problems, particularly those associated with the attraction of small metal parts or magnetic particles. For dual monolithic embodiments with permanent magnetic material used for the nubs 940, gluing or mechanically clamping the magnets together is likely necessary as the two permanent magnetic materials will not be attracted to each other.

Figure 9A:
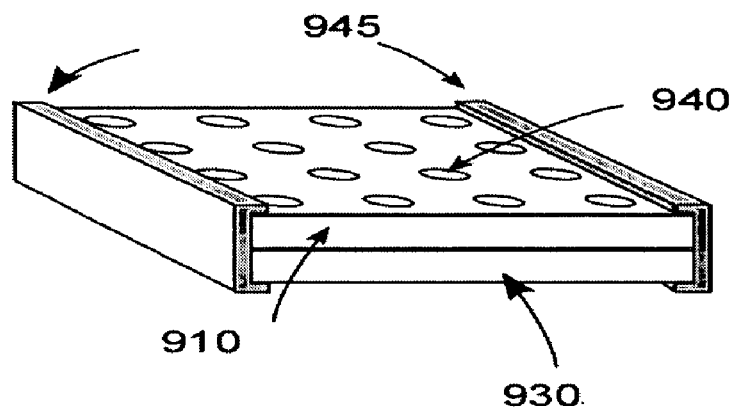
FIG. 9a shows the dual monolithic magnetic device arrangement of FIG. 9 with a mechanical clamp in accordance with the present invention.

In accordance with the present invention, an adhesive or a mechanical clamp 945 may be required to keep the top monolithic magnet 910 and the bottom monolithic magnet 930 together as shown in FIG. 9a. For instance, in embodiments discussed supra where two permanent monolithic magnets (i.e. top monolithic magnet 910 and bottom monolithic magnet 930 with nubs 940) are arranged together, an adhesive (i.e. glue) is likely necessary since the magnets will not attract each other. In instances involving permanent and soft monolithic magnets supra, an adhesive is likely not necessary since there is an attraction between magnets, however it still may be desirable to increase stability. In instances where no polymers are desired inside a package, adhesive use would be minimized or eliminated.

The magnet 900 is preferably assembled such that the nubs 940 of the bottom monolithic magnet 930 fill the holes 920 of the top monolithic magnet 910 in accordance with the present invention such that preferably the nubs 940 are level (fully filled) with a top surface of the top monolithic magnet 910. Still further embodiments of the present invention discussed supra and as shown in FIG. 9 would allow for the nubs 940 to extend beyond (over fill) the tops of the thru-holes 920 of the top magnet 910 and/or for the nubs 940 to be short (partially fill) of the tops of the thru-holes 920 of the top magnet 910. Such embodiments would have utility for high magnetic field gradients where an actuator or a fluid channel is partially inside the thru-hole 920 or above the nubs 940.

Further still, alternate embodiments modifying the structure of FIG. 9 may be alternately used to increase the magnetic flux gradient or to design around other components in a magnetic or electronic system whereby flux concentrating and/or guiding features are machined into the protruding nubs 940.

Figure 10:
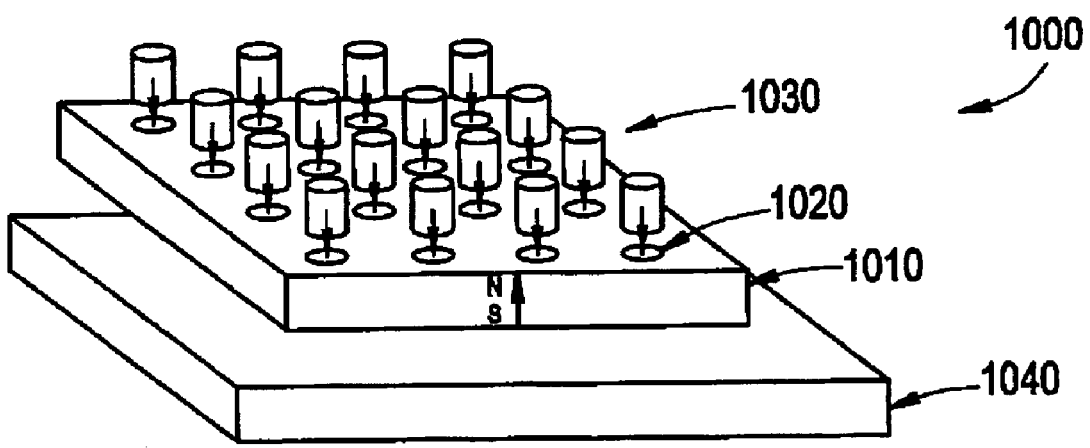
FIG. 10 shows a perspective view of a dual monolithic magnetic device arrangement, the top monolithic magnet with an array of thru-holes filled with individual inserts and a bottom monolithic plate in accordance with the present invention.

Referring now to FIG. 10, still yet another preferred embodiment of the instant invention of a dual monolithic magnet arrangement 1000 is shown having a top monolithic magnet 1010 with an array of formations or thru-holes 1020 and a bottom monolithic plate 1040. Individual inserts 1030 fill the thru-holes 1020 of the top monolithic magnet 1010. In accordance with the preferred embodiment of FIG. 10 of the present invention the top monolithic magnet 1010 is made of a hard magnetic material while the inserts 1030 and the bottom monolithic plate 1040 are made of a soft magnetic material.

This arrangement in FIG. 10 utilizing individual inserts 1030 would likely require more assembly than the embodiments described in conjunction with FIG. 9 above. However, the arrangement of FIG. 10 also provides a desirable high flux gradient. It would also be possible to extend the soft magnetic material beyond the hard or permanent magnetic material of the top magnet 1010 to provide a flux return path. This return path from the flux assists in minimizing the gaps between magnets.

Another variation of the dual monolithic magnet arrangement of FIG. 10 of the preferred embodiment of the invention would similarly allow for a top monolithic magnet 1010 with an array of thru-holes 1020 and a bottom monolithic plate 1040 where the filled holes or inserts 1030 are made of hard or permanent magnetic material rather than soft material as described above. In this arrangement, the top monolithic magnet 1010 is also made of a hard material while the bottom monolithic plate 1040 is made of a soft magnetic material. While the use of permanent magnetic material for the inserts 1030 may increase the cost of this type of design, the field gradient produced would be similar to that produced by the arrangement described supra where soft inserts 1030 are used. In both embodiments, the top monolithic magnet is made of, preferably, though not limited to, a hard magnetic material. Hence, also contemplated, an alternate preferred embodiment of the present invention having hard inserts 1030 filling thru-holes 1020 in a soft top monolithic magnet 1010 sitting on a soft bottom monolithic plate 1040.

A still further alternate preferred embodiment of the present invention having hard inserts 1030 filling thru-holes 1020 in a hard top monolithic magnet 1010 sitting on a hard bottom monolithic plate 1040 also provides a desired high magnetic field gradient. As discussed supra in conjunction with FIG. 9, this type of arrangement where the magnetic material of the top and bottom are not expected to attract each other, some adhesive or gluing or clamp to hold the magnets together would be required.

A still further alternate preferred embodiment of the present invention having soft inserts 1030 filling thru-holes 1020 in a hard top monolithic magnet 1010 sitting on a hard bottom monolithic plate 1040 also provides a desired magnetic field gradient.

With respect to the shape of inserts 1030 of FIG. 10, in accordance with the present invention, it may be preferable, though not a limitation, to have inserts 1030 which have a flat top surface. Insert 1030 top surfaces could alternately have a conical, pyramidal or rounded surface.

Figure 11:
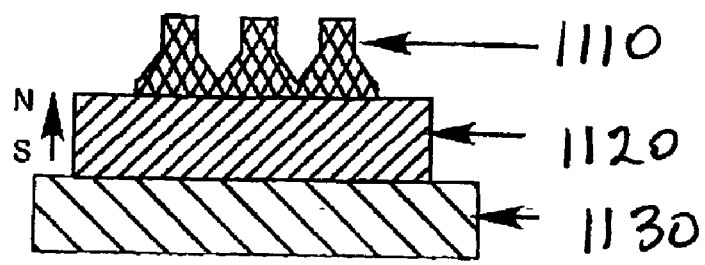
FIG. 11 shows a side view of a magnetic device arrangement, the monolithic magnet with an array of magnetic flux concentrators and a bottom plate in accordance with the present invention.
Figure 12:
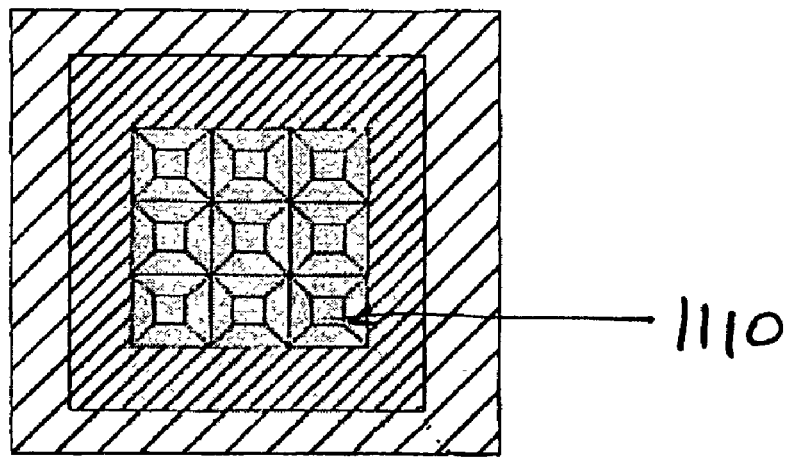
FIG. 12 shows a top view of FIG. 11.

Referring now to FIGS. 11 and 12, an alternate embodiment of a magnet arrangement of the preferred embodiment of the invention includes magnetic flux concentrators 1110, a monolithic magnet 1120, and a bottom plate 1130. A side view (FIG. 11) shows flux concentrators 1110 and bottom plate 1130 preferably made of soft magnetic material while the monolithic magnet 1120 is preferably made of permanent or hard magnetic material. In accordance with the preferred embodiment of the present invention, when concentrators 1110 are placed on top of magnet 1120, which is then placed on a top surface of bottom plate 1130, the soft magnetic flux concentrators 1110 create regions of high field gradient. The top view shown in FIG. 12 indicates the periodic array of flux concentrators 1110.

Figure 13:
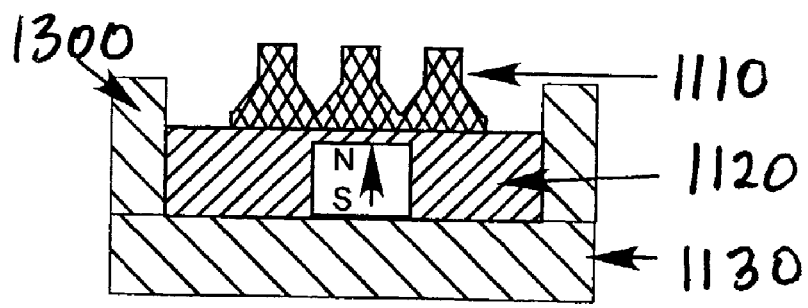
FIG. 13 shows a side view of a magnetic device arrangement with an array of magnetic flux concentrators and side plates in accordance with the present invention.

In addition to the flux return path of the bottom plate 1130, side plates 1300 shown in FIG. 13 could be added to FIG. 11 to decrease the reluctance of the air gap and to prevent or further reduce the interference of the magnetic flux of a neighboring device.

In each of the embodiments as discussed supra it may be desirable to have an additional base plate of soft magnetic material to assist in guiding the magnetic flux on the back of the magnet to reduce the flux path length.

Figure 21:
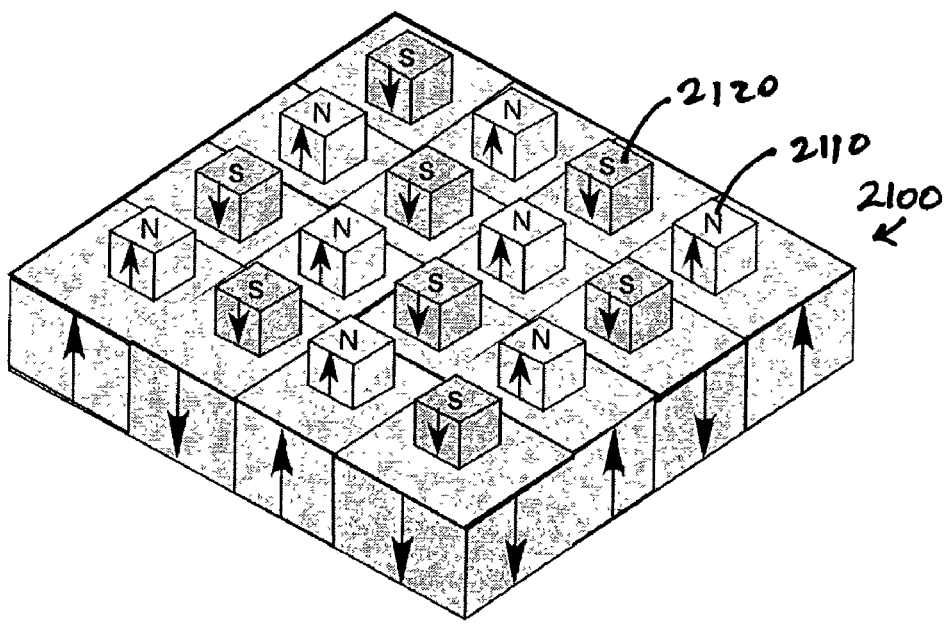
FIG. 21 shows a perspective view of a monolithic magnet with an array of spot-poled protruding nubs in accordance with the present invention.

To effectuate the desired high magnetic field gradient in the present invention, the polarity of adjacent magnets may alternate. For instance, referring to FIG. 2, if one nub of FIG. 2 has magnetic polarity pointing up out of the plane of the array or is poled "North", the adjacent nub may be poled "South" having magnetic polarity pointing down into the plane of the array. For example, this is illustrated in FIG. 21.

In each of the embodiments both the array of formations is periodic and the magnetic field produced is periodic. However, an aperiodic magnet array may also be useful to match an aperiodic MEMS device and is included within the scope of the present invention.

In addition to the MEMS application (i.e. MEMS device with an array of actuators), which is initially described supra in conjunction with FIG. 2, and is also applicable to all embodiments of the present invention described, other applications are contemplated for the use of monolithic and dual monolithic magnetic devices or materials with high magnetic field gradient. For instance, in accordance with another aspect of the present invention, a biochemical separation unit containing a magnetic array (such as in embodiments supra in conjunction with the present invention) and microfluidic channels for separating out magnetic particles tagged with bio-specific molecules for sensing the presence of a disease or specified chemicals is also desirable.

Figure 14:
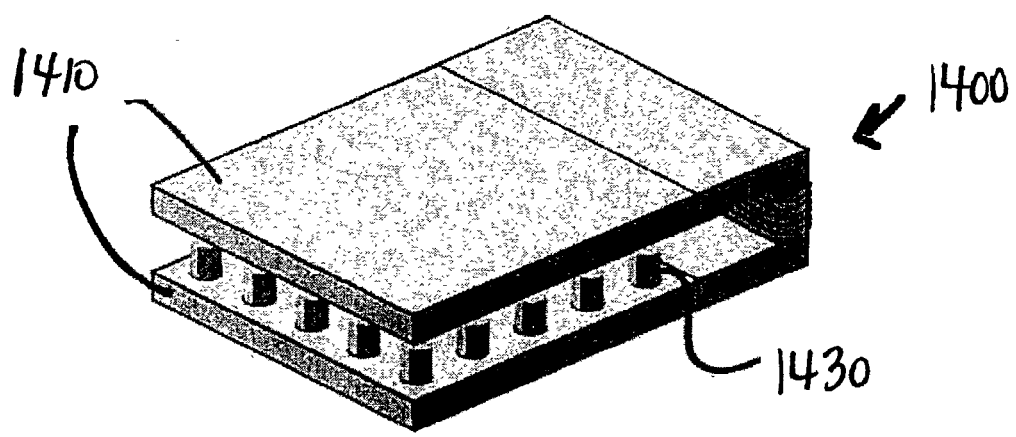
FIG. 14 shows a perspective view of an apparatus for spot-poling a monolithic magnet.

Referring now to FIG. 14, an apparatus 1400 for spot-poling a monolithic magnet in accordance with the present invention is shown to include soft magnetic plates 1410 with a bottom array of protruding teeth 1430.

Figure 15:
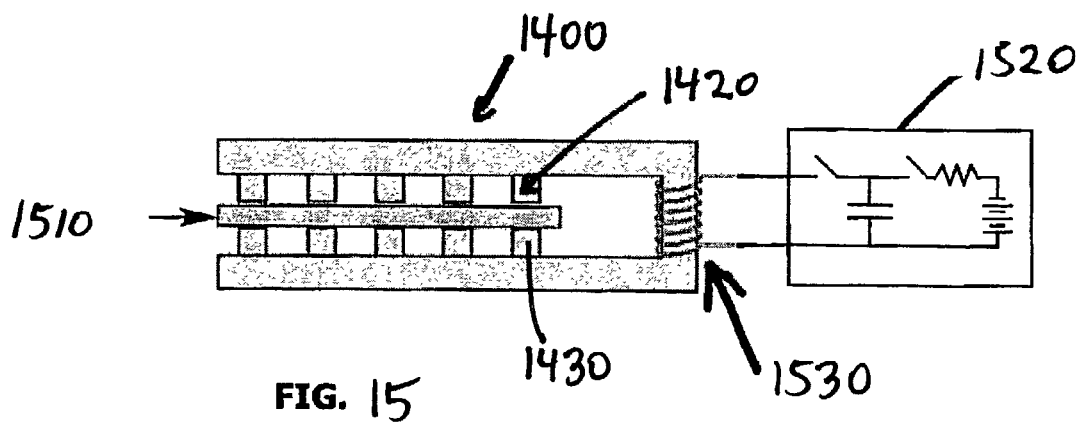
FIG. 15 shows a cross-section of FIG. 14 with a spot-poling circuit.

A cross-section of this apparatus 1400 also having a top array of teeth 1420 is shown in FIG. 15. As shown in FIG. 15, apparatus 1400 accepts a magnet plate 1510, which may initially be poled or un-poled, between top array of teeth 1420 and bottom array of teeth 1430.

Figure 19:
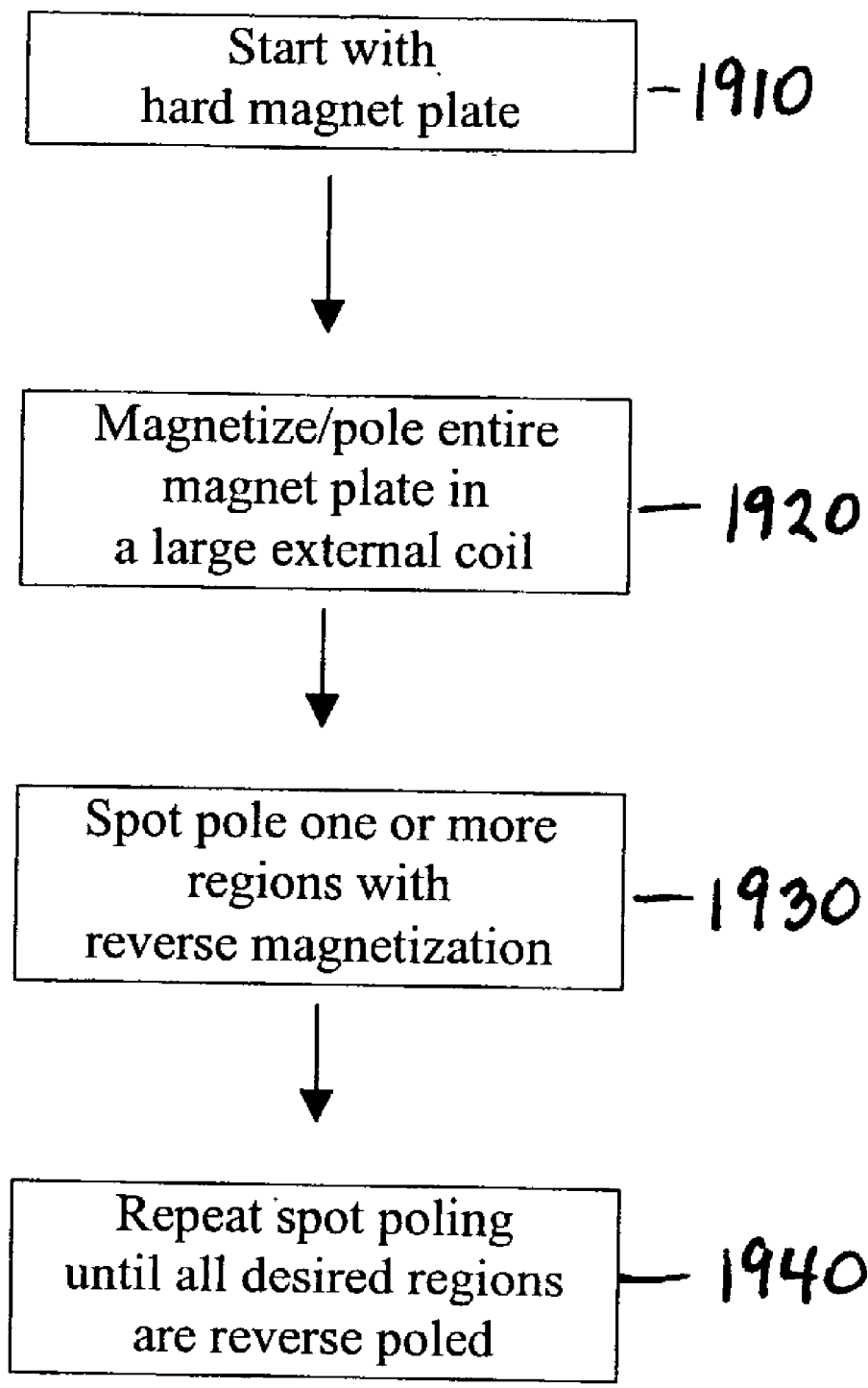
FIG. 19 shows a flow chart of a method for spot-poling a magnet in accordance with the present invention.

Referring simultaneously to a preferred spot-poling method shown in flow chart FIG. 19 in accordance with the present invention, and the magnet plate 1510 of FIG. 15 (at block 1910 of FIG. 19) the magnet plate 1510 is preferably made of a hard magnetic material. Magnet plate 1510 is inserted into apparatus 1400 after it is first magnetized (or poled) uniformly in one direction (at step 1920 of FIG. 19). For instance, magnet blank 1510 can be first poled south using a high magnetic field inside a coil as is well known in the art. When magnet plate 1510 is placed into the spot-poling apparatus 1400 (at step 1930 of FIG. 19) the polarization of certain regions on the magnet 1510 will be reversed (i.e. north) as described infra. This method is repeated as necessary at step 1940 as indicated in the flow chart of FIG. 19.

Also shown in FIG. 15 attached to spot-poling apparatus 1400 is a simplified circuit schematic 1520 consisting of a voltage supply which charges a high-voltage capacitor bank through a resistor. When the capacitor is charged to a sufficiently high voltage, it is discharged passing a very large current through the coil 1530 wrapped around the spot-poling apparatus 1400. This current carrying coil 1530 creates a large magnetic field momentarily in the regions between the top array of teeth 1420 and the bottom array of teeth 1430. The field in the region between the top and bottom arrays of teeth, 1420 and 1430 respectively, is large enough to reverse the polarization of the magnet, while the field in the regions around the arrays of teeth 1420 and 1430 is not strong enough to have this effect. Hence, only certain desired regions of the magnet 1510 have their polarization reversed. These fields are indicated infra with respect to the B-H curve shown in FIG. 18.

Figure 20:
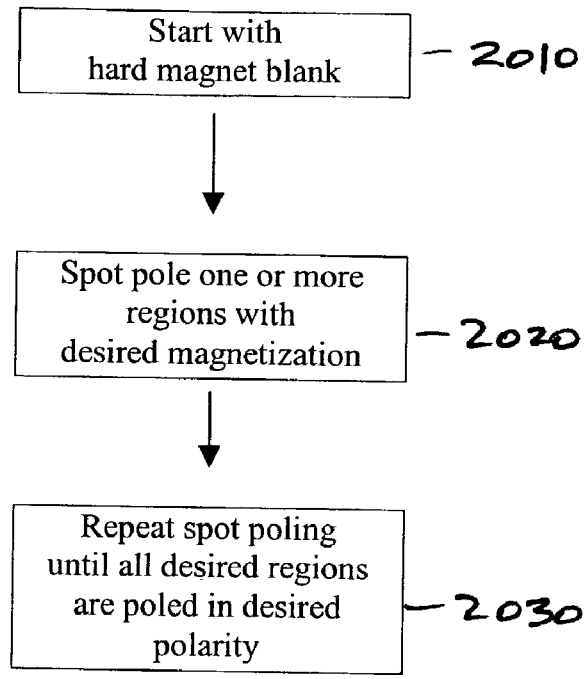
FIG. 20 shows a flow chart of an alternate method for spot-poling a magnet in accordance with the present invention.

In accordance with alternate method of the present invention as shown in the flow chart of FIG. 20, magnet plate 1510 is inserted into apparatus 1400 without it being first poled uniformly in one direction (at step 2010 of FIG. 20). For instance, magnet plate 1510 can first be inserted into the spot-poling apparatus 1400 un-poled and thereafter be spot-poled in a desired magnetization as shown at step 2020 of FIG. 20 (i.e. south) and then shifted or moved and spot-poled again with another desired magnetization at another spot or spots at step 2030 of FIG. 20 (i.e. north). This method is repeated as necessary as indicated at step 2030 in the flow chart of FIG. 20. It is understood in the art that to reverse the polarization achieved in apparatus 1400 the magnet plate 1510 may be flipped over or the direction of current through coil 1530 may be reversed by appropriate switching (not shown).

Referring now to FIG. 16, in accordance with a preferred embodiment of the present invention, the resulting spot-poled monolithic magnet 1600 is shown to include an area poled North 1610, labeled "N" and a remainder area poled South 1620, labeled "S". The North 1610 areas in magnet 1600 resulted from the field, described supra in conjunction with FIG. 15, that was strong enough to reverse the polarity, while the South 1620 areas were the areas not reversed because the field was not as strong.

Figure 17:
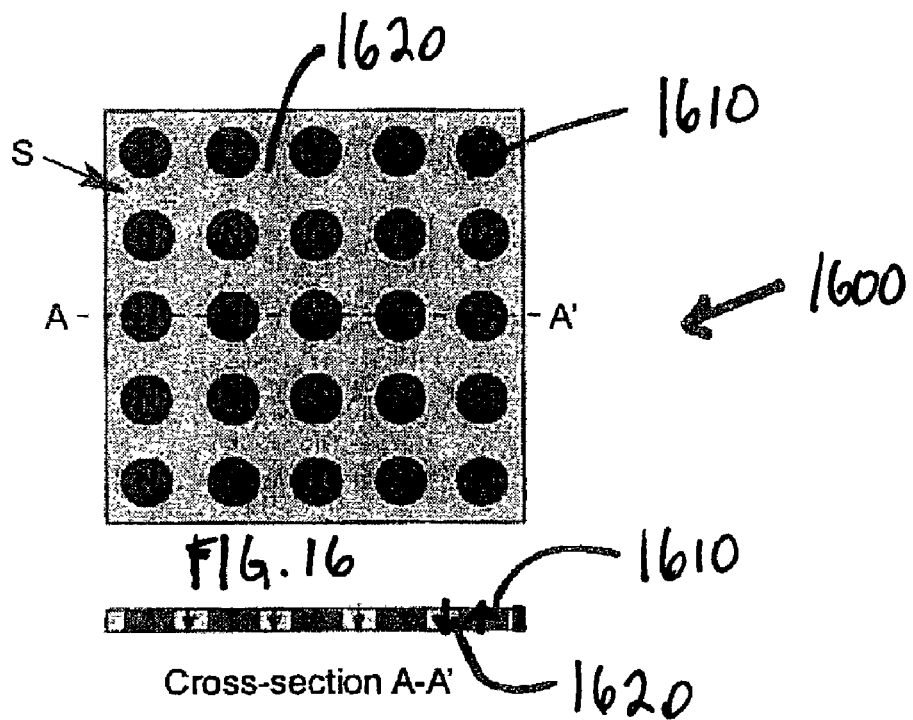
FIG. 17 shows a cross-section of a spot-poled monolithic magnet.

FIG. 17 shows a cross-section along line A–A' of spot-poled monolithic magnet 1600 of FIG. 16 where the arrows up and down indicate the North 1610 and South 1620 directions of the embodiment in FIG. 16.

Figure 18:
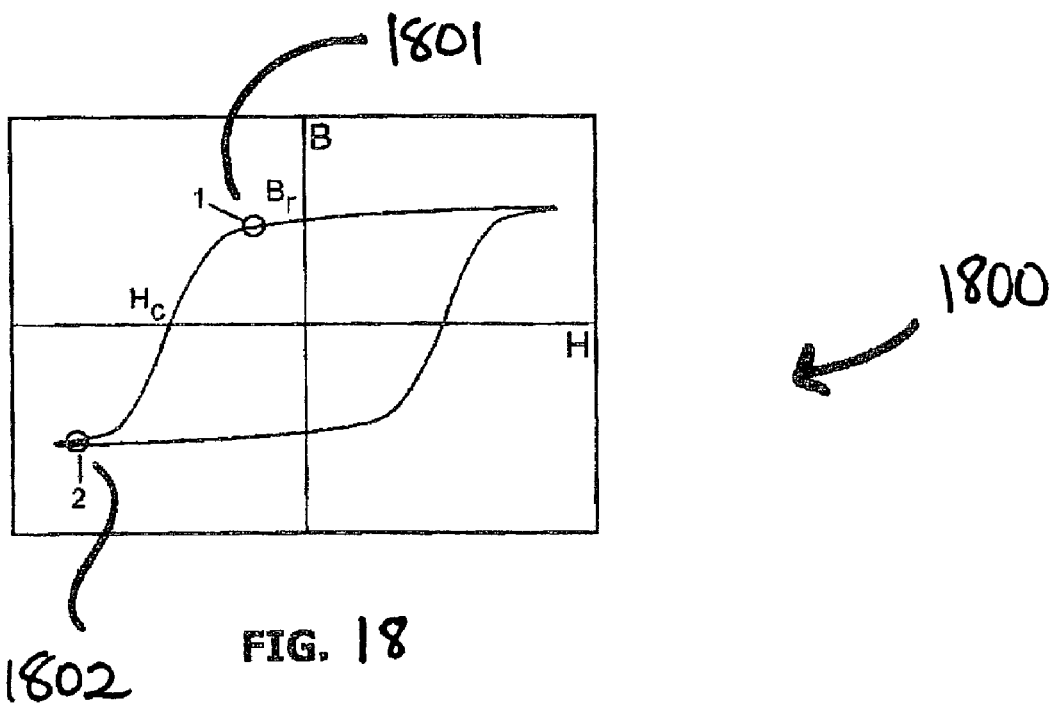
FIG. 18 shows a plot of a typical B-H curve for a hard magnetic material.

Referring now to FIG. 18, a plot of a typical B-H curve 1800 of a hard magnetic material, as it is known in the art, is shown. In accordance with the present invention, a point 1802 indicates the H field is of sufficient strength that the magnetization or polarity can be reversed whereas a point 1801 indicates the H field is of strength too weak to effect a polarization reversal. Point 1802 corresponds to the field in the regions at the teeth 1420 of FIG. 15, whereas Point 1801 corresponds to the field in the regions around the teeth 1420 of FIG. 15. It should be noted that the present invention is not limited to the curve shown in FIG. 18 and that other applications utilizing a different material with a different B-H curve would still retain the underlying aspect of the H field being sufficient to saturate the material.

Although the apparatus described supra spot-poles all "spots" on a magnet simultaneously, as in an array, in accordance with an alternate embodiment of the present invention, it is also contemplated and may be advantageous to spot-pole only one spot at a time or one cluster or row of spots at a time. Using the same apparatus as shown in FIGS. 14 and 15, the magnet or the apparatus can be indexed accordingly to pole the next spots until all desired spots have their polarization reversed.

The spot-poling method and apparatus described supra with respect to FIGS. 14–20 of the preferred embodiment of the present invention is a less expensive and simpler approach. Alternative effective methods in lieu of spot-poling a monolithic magnet, as discussed supra in FIG. 10 for instance, include drilling holes into a magnet and inserting soft magnetic rods into the holes. While these preferred methods of the present invention have been proven to work robustly, they may be more costly and more complex than the spot-poling method and apparatus of the present invention.

In accordance with an alternate embodiment of the present invention shown in FIG. 21, the spot-poling method and apparatus described supra with respect to a magnet can be extended to a monolithic magnetic material with protruding nubs (i.e. FIG. 2) where a hard monolithic magnet 2100 is placed into apparatus 1400 and is poled with alternating North 2110 and South 2120 polarity on alternating nubs as shown. Furthermore, in accordance with the present invention, the hard magnetic arrays of 930, 940, and 1010 of dual monolithic magnets in FIGS. 9 and 10, respectively, can also be spot-poled (not shown).

Having described various preferred embodiments of the present invention, It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A magnetic device comprising:
 a monolithic body having formations, said formations producing a magnetic field gradient; and
 a MEMS device with an array of actuators such that each of said actuators is placed above each of said formations.

2. The magnetic device of claim 1 wherein said formations are constructed from said monolithic body.

3. The magnetic device of claim 2 wherein said formations comprise an array of protruding nubs or ridges.

4. The magnet of claim 3 wherein said monolithic body and said formations are made of a permanent or hard magnetic material.

5. The magnetic device of claim 3 wherein said formations are periodic.

6. The magnetic device of claim 5 wherein the magnetic field gradient produced by said formations is periodic.

7. The magnetic device of claim 1 wherein said formations comprise an array of thru-holes.

8. The magnetic device of claim 7 wherein said monolithic body is made of a permanent or hard magnetic material.

9. The magnetic device of claim 8 wherein said thru-holes are filled with soft magnetic material or fill.

10. The magnetic device of claim 9 wherein said thru-holes are partially filled with said soft magnetic material or fill.

11. The magnetic device of claim 9 wherein said thru-holes are fully filled with said soft magnetic material or fill.

12. The magnetic device of claim 9 wherein said thru-holes are over filled with said soft magnetic material or fill.

13. The magnetic device of claim 9 wherein a layer of said soft fill covers a portion of said monolithic body.

14. The magnetic device of claim 9 wherein a screening process is used to fill said thru-holes.

15. The magnetic device of claim 7 wherein said monolithic body is made of a soft magnetic material and said thru-holes are filled with hard magnetic material or fill.

16. The magnetic device of claim 15 wherein said thru-holes are partially filled with said hard magnetic material or fill.

17. The magnetic device of claim 15 wherein said thru-holes are fully filled with said hard magnetic material or fill.

18. The magnetic device of claim 15 wherein said thru-holes are over filled with said hard magnetic material or fill.

19. The magnetic device of claim 15 wherein a screening process is used to fill said thru-holes.

20. The magnetic device of claim 1 wherein said formations comprise an array of blind-holes.

21. The magnetic device of claim 20 wherein said monolithic body is made of a permanent or hard magnetic material.

22. The magnetic device of claim 21 wherein said blind-holes are filled with soft magnetic material or fill.

23. The magnetic device of claim 21 wherein said blind-holes are partially filled with said soft magnetic material or fill.

24. The magnetic device of claim 21 wherein said blind-holes are fully filled with said soft magnetic material or fill.

25. The magnetic device of claim 21 wherein said blind-holes are over filled with said soft magnetic material or fill.

26. The magnetic device of claim 22 wherein a screening process is used to fill said blind-holes.

27. The magnetic device of claim 20 wherein said monolithic body is made of a soft magnetic material.

28. The magnetic device of claim 27 wherein said blind-holes are filled with a hard magnetic material or fill.

29. The magnetic device of claim 28 wherein said blind-holes are partially filled with said hard magnetic material or fill.

30. The magnetic device of claim 28 wherein said blind-holes are fully filled with said hard magnetic material or fill.

31. The magnetic device of claim 28 wherein said blind-holes are over filled with said hard magnetic material or fill.

32. The magnetic device of claim 28 wherein a screening process is used to fill said blind-holes.

33. The magnetic device of claim 7 wherein said thru-holes are periodic and magnetic field produced is periodic.

34. The magnetic device of claim 20 wherein said blind-holes are periodic and magnetic field produced is periodic.

35. The magnetic device of claim 2 wherein said formations comprise thru-holes and blind-holes.

36. The magnetic device of claim 1 wherein said actuators are electromagnetic mirrors.

37. A magnetic device comprising:
a monolithic body having formations, said formations producing a magnetic field gradient; and a biochemical separation unit capable of separating out magnetic particles.

38. A dual monolithic magnetic device comprising:
a first monolithic body having first formations,
and a second monolithic body having second formations, wherein said first monolithic body is placed on said second monolithic body producing a magnetic field gradient; and
a MEMS device having an array of actuators wherein each actuator is placed above each of said first formations.

39. The magnetic device of claim 38 wherein said first and second formations are periodic and wherein the magnetic field gradient produced by said first and second formations is periodic.

40. The magnetic device of claim 38 wherein said first formations are an array of thru-holes.

41. The magnetic device of claim 40 wherein said second formations are an array of protruding nubs.

42. The magnetic device of claim 41 wherein said first monolithic body is made of a permanent or a hard magnetic material and said second monolithic body is made of a soft magnetic material.

43. The magnetic device of claim 42 wherein said second formations are made of a soft magnetic material.

44. The magnetic device of claim 42 wherein said second formations are level with a top surface of said first formations on said first monolithic body.

45. The magnetic device of claim 42 wherein said second formations fall below a top surface of said first formations on said first monolithic body.

46. The magnetic device of claim 42 wherein said second formations extend above a top surface of said first formations on said first monolithic body.

47. The magnetic device of claim 38 wherein the first monolithic body and the second monolithic body are held together with an adhesive.

48. The magnetic device of claim 38 wherein the first monolithic body and the second monolithic body are placed together with a mechanical clamp.

49. The magnetic device of claim 38 wherein said second formations have guiding or flux concentrating features.

50. The magnetic device of claim 41 wherein said first monolithic body is made of a soft magnetic material and said second monolithic body is made of a permanent or a hard magnetic material.

51. The magnetic device of claim 50 wherein said second formations are made of a permanent or hard magnetic material.

52. The magnetic device of claim 50 wherein said second formations are level with a top surface of said first formations on said first monolithic body.

53. The magnetic device of claim 50 wherein said second formations fall below a top surface of said first formations on said first monolithic body.

54. The magnetic device of claim 50 wherein said second formations extend above a top surface of said first formations on said first monolithic body.

55. The magnetic device of claim 41 wherein said first monolithic body is made of a hard magnetic material and said second monolithic body is made of a permanent or a hard magnetic material.

56. The magnetic device of claim 55 wherein said second formations are made of a permanent or hard magnetic material.

57. The magnetic device of claim 56 wherein said second formations are level with a top surface of said first formations on said first monolithic body.

58. The magnetic device of claim 56 wherein said second formations fall below a top surface of said first formations on said first monolithic body.

59. The magnetic device of claim 56 wherein said second formations extend above a top surface of said first formations on said first monolithic body.

60. The magnetic device of claim 38 wherein said actuators are electromagnetic mirrors.

61. A dual monolithic magnetic device comprising:
a first monolithic body having first formations,
a second monolithic body having second formations, wherein said first monolithic body is placed on said second monolithic body producing a magnetic field gradient; and a biochemical separation unit capable of separating out magnetic particles.

62. A dual monolithic magnetic device comprising:
a first monolithic body having first formations,
and a second monolithic body, wherein first monolithic body is placed on second monolithic body producing a magnetic field gradient; and
a MEMS device having an array of actuators wherein each actuator is placed above each of said first formations.

63. The magnetic device of claim 62 wherein said first formations are periodic and wherein the magnetic field gradient produced by said first formations is periodic.

64. The magnetic device of claim 62 wherein said first formations further comprise an array of thru-holes.

65. The magnetic device of claim 62 wherein an array of individual inserts of magnetic material are inserted into said thru-holes.

66. The magnetic device of claim 65 wherein said inserts are level with a top surface of said thru-holes on said first monolithic body.

67. The magnetic device of claim 65 wherein said inserts fall below a top surface of said thru-holes on said first monolithic body.

68. The magnetic device of claim 65 wherein said inserts extend above a top surface of said thru-holes on said first monolithic body.

69. The magnetic device of claim 62 wherein the first monolithic body and the second monolithic body are placed together with an adhesive.

70. The magnetic device of claim 62 wherein the first monolithic body and the second monolithic body are placed together with a mechanical clamp.

71. The magnetic device of claim 65 wherein said first monolithic body is made of a permanent or a hard magnetic material and said second monolithic body is made of a soft magnetic material.

72. The magnetic device of claim 71 wherein said inserts are made of a soft magnetic material.

73. The magnetic device of claim 71 wherein said inserts are made of a permanent or hard magnetic material.

74. The magnetic device of claim 65 wherein said first monolithic body is made of a soft magnetic material and said second monolithic body is made of a soft magnetic material.

75. The magnetic device of claim 74 wherein said inserts are made of a hard magnetic material.

76. The magnetic device of claim 65 wherein said first monolithic body is made of a permanent or a hard magnetic material and said second monolithic body is made of a hard magnetic material.

77. The magnetic device of claim 76 wherein said inserts are made of a soft magnetic material.

78. The magnetic device of claim 76 wherein said inserts are made of a permanent or hard magnetic material.

79. The magnetic device of claim 65 wherein said inserts have a flat top surface.

80. The magnetic device of claim 65 wherein said inserts have a conical top surface.

81. The magnetic device of claim 65 wherein said inserts have a pyramidal top surface.

82. The magnetic device of claim 65 wherein said inserts have a rounded top surface.

83. The magnetic device of claim 62 wherein said actuators are electromagnetic mirrors.

84. A dual monolithic magnetic device comprising:
a first monolithic body having first formations,
and a second monolithic body, wherein first monolithic body is placed on second monolithic body producing a magnetic field gradient; and a biochemical separation unit capable of separating out magnetic particles.

* * * * *